United States Patent
Davis et al.

(10) Patent No.: US 11,193,386 B2
(45) Date of Patent: Dec. 7, 2021

(54) SHAPED COOLING PASSAGES FOR TURBINE BLADE OUTER AIR SEAL

(71) Applicant: Raytheon Technologies Corporation, Farmington, CT (US)

(72) Inventors: Timothy M. Davis, Kennebunk, ME (US); Paul M. Lutjen, Kennebunkport, ME (US); Kevin J. Ryan, Alfred, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 1294 days.

(21) Appl. No.: 15/157,857

(22) Filed: May 18, 2016

(65) Prior Publication Data

US 2017/0335706 A1 Nov. 23, 2017

(51) Int. Cl.
| | | |
|---|---|---|
| F01D 11/08 | (2006.01) | |
| F01D 25/12 | (2006.01) | |
| B22C 9/10 | (2006.01) | |
| F01D 5/06 | (2006.01) | |
| F02C 3/04 | (2006.01) | |

(52) U.S. Cl.
CPC ............. *F01D 11/08* (2013.01); *B22C 9/103* (2013.01); *F01D 5/06* (2013.01); *F01D 25/12* (2013.01); *F02C 3/04* (2013.01); *F05D 2220/32* (2013.01); *F05D 2230/21* (2013.01); *F05D 2240/11* (2013.01); *F05D 2240/35* (2013.01); *F05D 2260/232* (2013.01)

(58) Field of Classification Search
CPC ...... F01D 11/08; F01D 25/12; F05D 2240/11; F05D 2260/202
See application file for complete search history.

(56) References Cited

U.S. PATENT DOCUMENTS

| | | | |
|---|---|---|---|
| 5,243,759 A | 9/1993 | Brown et al. | |
| 5,326,224 A * | 7/1994 | Lee | ......................... F01D 5/186 416/90 R |
| 5,575,973 A | 11/1996 | Choi et al. | |
| 5,649,806 A | 7/1997 | Scricca et al. | |

(Continued)

FOREIGN PATENT DOCUMENTS

| | | |
|---|---|---|
| EP | 1854567 A2 | 11/2007 |
| EP | 1905958 A2 | 4/2008 |

(Continued)

OTHER PUBLICATIONS

European Search Report for EP Application No. 17171827.3 dated Oct. 4, 2017.

*Primary Examiner* — Scott J Walthour
(74) *Attorney, Agent, or Firm* — Carlson, Gaskey & Olds, P.C.

(57) ABSTRACT

A core assembly for fabricating an air cooled engine component for a gas turbine engine includes an end portion for defining passages within a side of an engine component. The end portion defines a first cross-section. A middle portion is spaced apart from the end portion and defines passages through a middle part of the engine component. The middle portion defines a second cross-section. One of the first cross-section and the second cross-section includes a first height greater than a second height. An air cooled engine component for a gas turbine engine and a gas turbine engine are also disclosed.

2 Claims, 3 Drawing Sheets

(56) References Cited

U.S. PATENT DOCUMENTS

| | | | |
|---|---|---|---|
| 5,964,575 A * | 10/1999 | Marey | F01D 25/12 |
| | | | 415/115 |
| 6,139,257 A * | 10/2000 | Proctor | F01D 9/04 |
| | | | 415/115 |
| 6,984,102 B2 | 1/2006 | Bunker et al. | |
| 7,273,351 B2 * | 9/2007 | Kopmels | F01D 5/186 |
| | | | 416/97 R |
| 7,306,424 B2 | 12/2007 | Romanov et al. | |
| 7,621,719 B2 | 11/2009 | Lutjen et al. | |
| 7,650,926 B2 | 1/2010 | Tholen | |
| 7,686,068 B2 | 3/2010 | Tholen et al. | |
| 7,874,792 B2 | 1/2011 | Tholen et al. | |
| 8,061,979 B1 | 11/2011 | Liang | |
| 8,366,383 B2 | 2/2013 | Thibodeau et al. | |
| 8,596,963 B1 * | 12/2013 | Liang | F01D 11/12 |
| | | | 29/889.22 |
| 8,858,159 B2 | 10/2014 | Piggush et al. | |
| 8,876,458 B2 | 11/2014 | Thibodeau et al. | |
| 9,103,225 B2 | 8/2015 | Lutjen et al. | |
| 2007/0248462 A1 | 10/2007 | Lutjen et al. | |
| 2009/0067994 A1 * | 3/2009 | Pietraszkiewicz | F01D 11/08 |
| | | | 415/173.1 |
| 2013/0209229 A1 * | 8/2013 | Xu | F01D 5/186 |
| | | | 415/115 |
| 2013/0340966 A1 | 12/2013 | Tholen et al. | |
| 2016/0332229 A1 * | 11/2016 | Snyder | F01D 25/12 |
| 2017/0226885 A1 * | 8/2017 | Clum | F01D 25/12 |

FOREIGN PATENT DOCUMENTS

| | | |
|---|---|---|
| EP | 1965033 A2 | 9/2008 |
| EP | 1990507 A1 | 11/2008 |
| JP | 2010276010 A * | 12/2010 |
| WO | 2015130380 A2 | 9/2015 |

* cited by examiner

SHAPED COOLING PASSAGES FOR TURBINE BLADE OUTER AIR SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Various components are supported within a case to define a gas path for the high-energy exhaust flow. Components within the gas path are exposed to extremes of temperatures and pressures that can exceed material capabilities. Accordingly, cooling air is provided along surfaces of gas path components to maintain temperatures within acceptable material capabilities.

One component within the gas path is a blade outer air seal that is disposed adjacent to a rotating airfoil of within the turbine section. The blade outer air seal defines a clearance between the airfoil and the static structure of the engine. Cooling passages defined within the blade outer air seal are formed utilizing a core that is later removed. Cooling passages perform best when relatively small such that thermal energy may be efficiently transferred to the cooling fluid. However, the thinner smaller passages require thinner smaller core cross-sections that can be fragile and complicate manufacture.

SUMMARY

In a featured embodiment, a core assembly for fabricating an air cooled engine component for a gas turbine engine includes an end portion for defining passages within a side of an engine component. The end portion defines a first cross-section. A middle portion is spaced apart from the end portion and defines passages through a middle part of the engine component. The middle portion defines a second cross-section. One of the first cross-section and the second cross-section includes a first height greater than a second height.

In another embodiment according to the previous embodiment, the first cross-section includes the first height and the second cross-section includes the second height.

In another embodiment according to any of the previous embodiments, the first height is uniform across the first cross-section for a first width and the second height is uniform across the second cross-section for a second width.

In another embodiment according to any of the previous embodiments, includes a transition portion between the middle portion and the end portion. The transition portion includes a third cross-section including a third height that is greater than the second height and less than the first height.

In another embodiment according to any of the previous embodiments, the middle portion includes a middle length. The end portion includes an end length and the transition portion includes a transition length with the transition length being smaller than both the middle length and the end length.

In another embodiment according to any of the previous embodiments, the first height is no more than twice as large as the second height.

In another embodiment according to any of the previous embodiments, the end portion includes a first end portion and a second end portion and both the first side portion and the second side portion define passages including the first height and the first width.

In another embodiment according to any of the previous embodiments, side portion and the middle portion include a single unitary integral part for forming continuous passages from the first end to the second end.

In another embodiment according to any of the previous embodiments, the first cross-section includes a middle part disposed between a first side and a second side, with each of the first side and the second side being at the first height and the middle part being the second height.

In another embodiment according to any of the previous embodiments, the first cross-section includes a middle part disposed between a first side and a second side, with each of the first side and the second side being at the second height and the middle part being the first height.

In another embodiment according to any of the previous embodiments, the first cross-section includes a middle part disposed between a first side and a second side, with the middle part being the first height and tapering from the first height to the second height at each of the first side and the second side.

In another featured embodiment, an air cooled engine component for a gas turbine engine includes a first end, a second end, a middle portion, and at least one passage extends from the first end through the middle portion to the second end. The at least one passage includes a first cross-section within the first end and the second end and a second cross-section within the middle portion. One of the first cross-section and the second cross-section includes a first height greater than a second height.

In another embodiment according to the previous embodiment, the first cross-section includes the first height and the second cross-section includes the second height.

In another embodiment according to any of the previous embodiments, the first height is uniform across the first cross-section for a first width and the second height is uniform across the second cross-section for a second width.

In another embodiment according to any of the previous embodiments, includes a transition portion between the middle portion and each of the first end and the second end. The transition portion includes a third cross-section including a third height that is greater than the second height and less than the first height.

In another embodiment according to any of the previous embodiments, the first height is no more than twice as large as the second height.

In another embodiment according to any of the previous embodiments, the first cross-section includes a middle part disposed between a first side and a second side, with each of the first side and the second side being at the first height and the middle part being the second height.

In another embodiment according to any of the previous embodiments, the first cross-section includes a middle part disposed between a first side and a second side, with each of the first side and the second side being at the second height and the middle part being the first height.

In another embodiment according to any of the previous embodiments, the first cross-section includes a middle part disposed between a first side and a second side, with the middle part being the first height and tapering from the first height to the second height at each of the first side and the second side.

In another featured embodiment, a gas turbine engine includes a compressor section. A combustor receives compressed air from the compressor section for mixing with fuel to generate a high-energy exhaust gas flow. A turbine section receives the high-energy exhaust gas flow from the combustor for driving the compressor section. The turbine section includes a plurality of rotating stages and blade outer air seals defining a portion of a gas flow path. The blade outer air seal includes a first end, a second end, a middle portion, and at least one passage extending from the first end through the middle portion to the aft end. The at least one passage includes a first cross-section within the first end and the second end and a second cross-section within the middle portion. One of the first cross-section and the second cross-section includes a first height greater than a second height.

In another embodiment according to the previous embodiment, the blade outer air seal includes a transition portion between the middle portion and each of the first end and the second end. The transition portion includes a third cross-section including a third height that is greater than the second height and less than the first height and the first height is no more than twice as large as the second height.

In another embodiment according to any of the previous embodiments, the first cross-section includes a middle part disposed between a first side a second side, with each of the first side and the second side being at the first height and the middle part being the second height.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
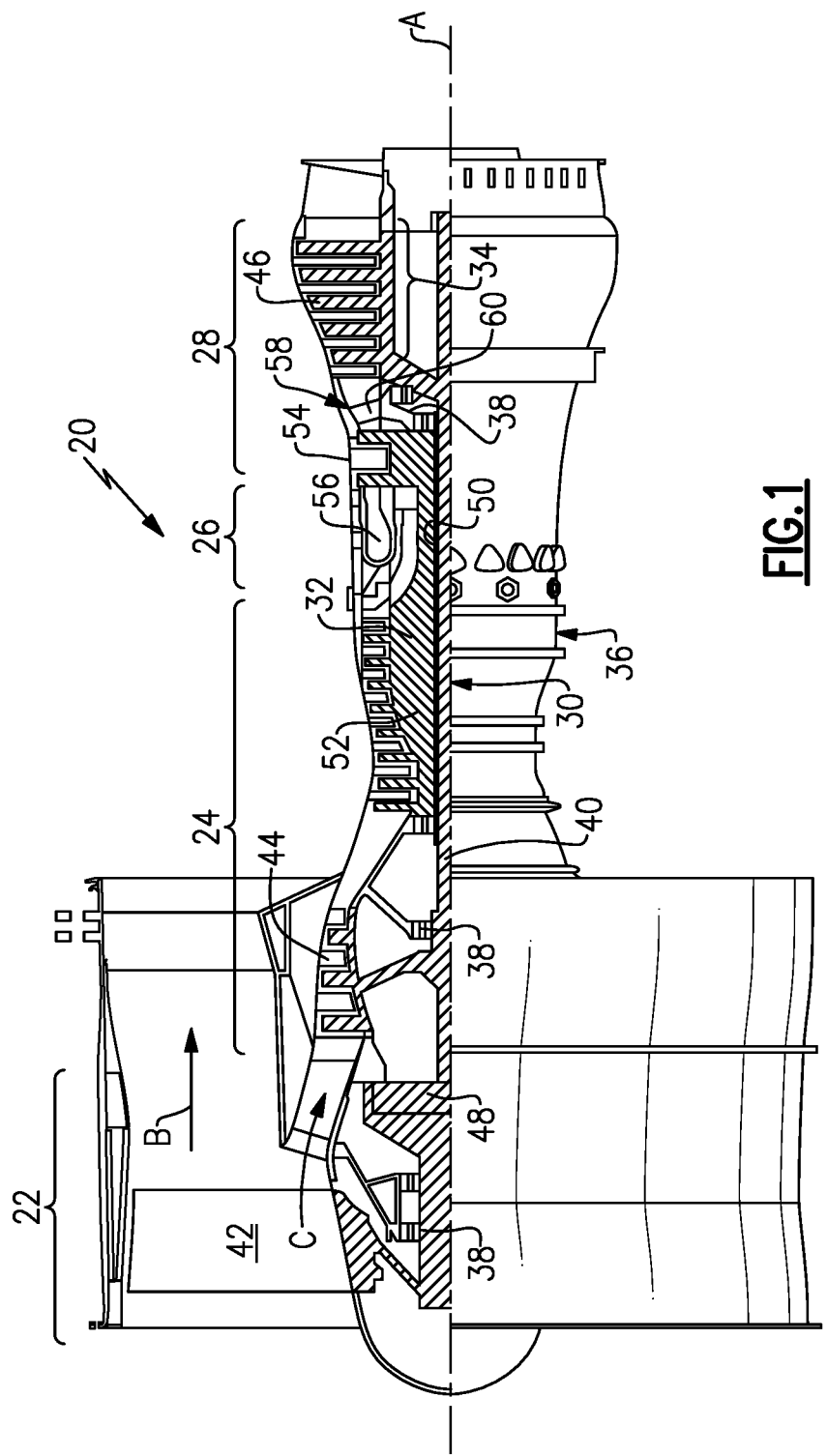
FIG. 1 is a schematic view of an example gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high energy exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram° R)/(518.7° R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
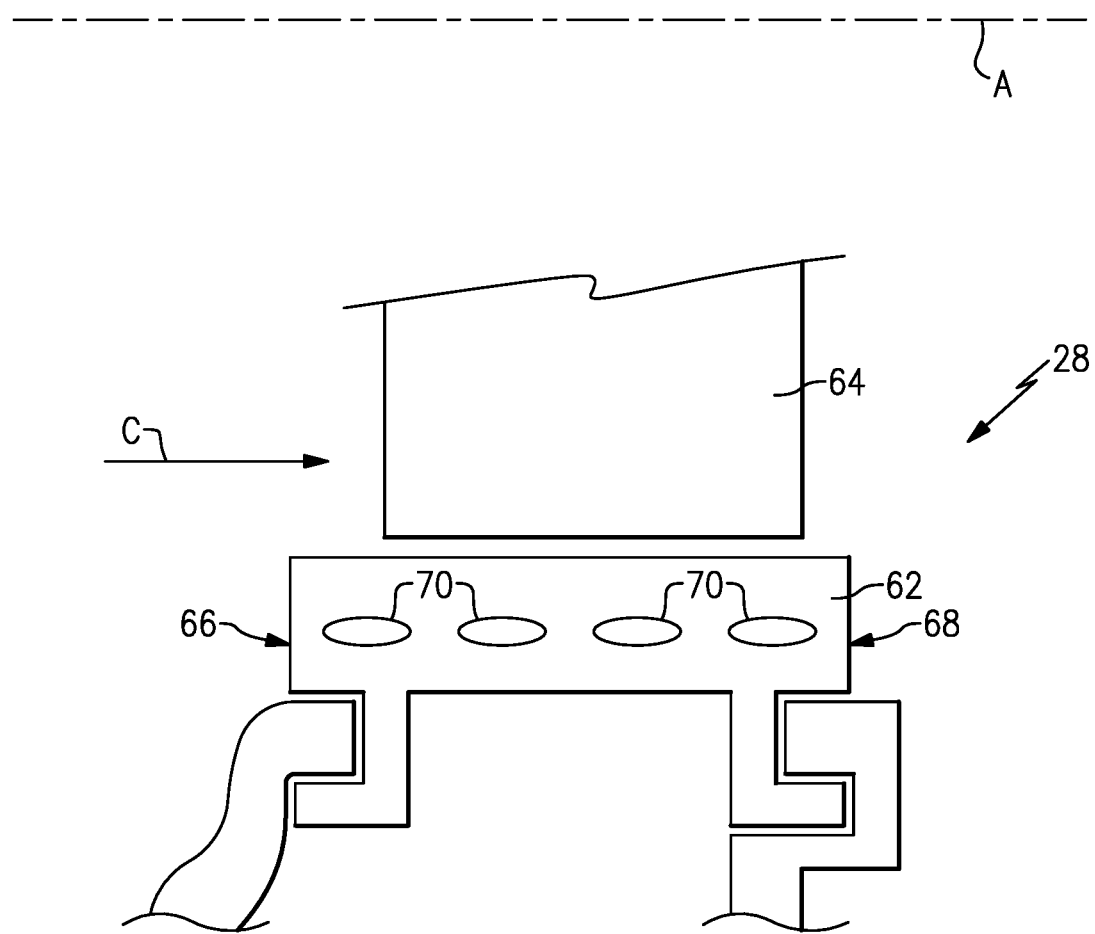
FIG. 2 is a schematic view of a portion of a turbine section.

Referring to FIG. 2 with continued reference to FIG. 1, a blade outer air seal (BOAS) 62 defines a portion of the core flow path C for the high-energy exhaust gasses generated in the combustor 56. The BOAS 62 is disposed radially outward of a rotating airfoil 64. The BOAS 62 includes passages 70 that receive cooling air utilized to maintain the gas path surface at a temperature within material capabilities. The BOAS 62 includes a forward side 66 and an aft side 68. Each of the BOAS 62 are disposed within channels defined within a static structure 36 of the turbine engine 20. The BOAS 62 are supported within the static structure 36 and circumferentially surround rotatable airfoils 64 of the turbine section 28.

Figure 3:
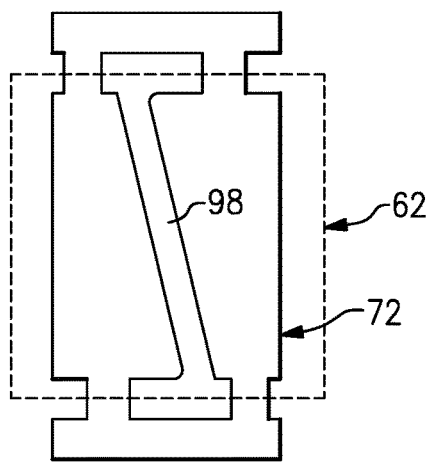
FIG. 3 is a schematic view of a core for defining passages within a blade outer air seal.

Referring to FIG. 3 with continued reference to FIG. 2, each of the BOAS 62 includes the air passages 70 for cooling air flow. The passages 70 are formed using a sacrificial core schematically indicated at 72. FIG. 3 illustrates the blade outer air seal 62 perimeter outline relative to the core 72. The core 72 is of a material that may be over molded with the metal alloy utilized to construct and form the BOAS 62 while being able to be removed once the BOAS 62 is completely formed. This disclosure contemplates use of the disclosed core 72 with any variation of known lost core molding processes.

As with all lost core molding processes, the core 72 defines empty spaces within the interior sections of a completed BOAS 62. Similarly, open spaces in the core 72 define rigid and solid structures of the completed BOAS 62. In this example, the core 72 includes an open section 98 that is utilized to form a solid rib or wall portion within an interior space of the completed BOAS 62. The structure of the BOAS 62 is therefore dependent on the structure of the core 72 and both the completed BOAS 62 and the core 72 are within the contemplation of this disclosure.

Accordingly, the core 72 defines air passages extending through the BOAS 62. Smaller airflow passages provide better thermal transfer as compared to larger airflow passages and therefore it is desirable to provide the core 72 with a small cross-sectional area to define smaller air flow passages through the BOAS 62. Smaller cross-sections, however may make certain core sections fragile and difficult to handle during manufacturing. Moreover, thinner core sections 72 complicate manufacturing and can result in undesirable defects within the finished blade outer air seal 62.

The example core 72 includes features that define air passages to improve thermal transfer while also improving manufacturability by tailoring cross-sectional areas and shapes in areas particularly susceptible to damage during manufacturing.

Figure 4:
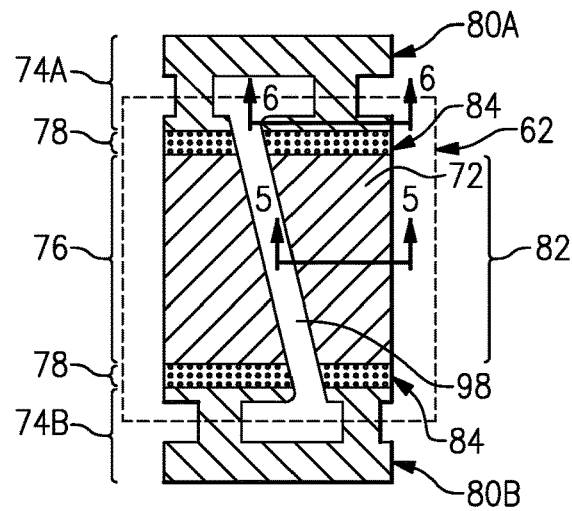
FIG. 4 is a schematic view of an example core for defining features within a blade outer air assembly.
Figure 5:
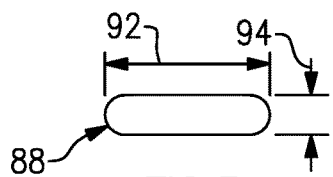
FIG. 5 is a schematic view of a passage cross-section embodiment.
Figure 6:
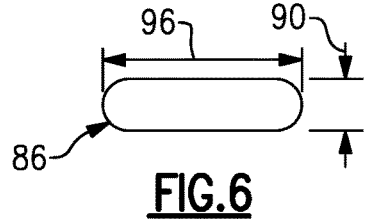
FIG. 6 is a schematic of another passage cross-section embodiment.

Referring to FIGS. 4, 5 and 6, an example core 72 is shown that defines air passages through a BOAS 62 and includes an open section 98. The open section 98 defines a solid rib in the completed BOAS 62. The core 72 includes middle portion 82 between a first end portion 80a and a second end portion 80b. A transition portion 84 is disposed between the middle portion 82 and each of the end portions 80a and 80b. The end portions 80a, 80b, middle portion 82 and transition portions 84 refer to features in the core 72. Accordingly, the example core 72 includes a non-uniform shape from the first end portion 80a to the second end portion 80b.

The features of the core 72 correspond to portions of completed passages in the completed BOAS 62. In the BOAS 62, each of the airflow passages 70 (FIG. 2) includes end portions 74A, 74B, transition portions 78 and middle portions 76. The airflow passages 70 are continuous from one end portion 74A to the other end portion 74B.

The core 72 defines the features of the passages 70 and include a first passage cross-section 86. The first passage cross section 86 defines the cross-section at the end portions 80b and 80a. The first passage cross-section 86 includes a first height 90 and a first width 96. A second passage cross-section 88 defines the core 72 within the middle portion 82. The second passage cross-section 88 includes a height 94 and a width 92. The first passage cross-section 86 and the second passage cross-section 88 refer to portions of the core 72 that define the completed passages and open areas.

The core portion that defines the first passage cross-section 86 includes the first height 90 which is larger than the second height 94 of the second passage cross section 88. In one example embodiment, the first height 90 is two times greater than the second height 94. In another example embodiment, the first height 90 is no more than two times the second height 94. Accordingly, the end portions 80a and 80b include a larger core cross-section and thereby forms a larger completed air passage within end portions 74A, 74B in the completed BOAS 62.

The transition area portion 84 of the core 72 includes a passage cross-section that transitions between the second cross section 88 of the middle portion 82 to the larger first cross-sections 86 at the end portions 80a and 80b. The variable height of the passages enable the use of thicker core sections in areas most susceptible to damage during manufacturing. The thinner second passage cross-section 88 defined by the core 72 in areas not as susceptible to damage during manufacture. The resulting air passage cross-section in the middle portion 76 of the completed BOAS 62 therefore benefits from the improved thermal transfer properties provided by the smaller cross-section.

Figure 7:
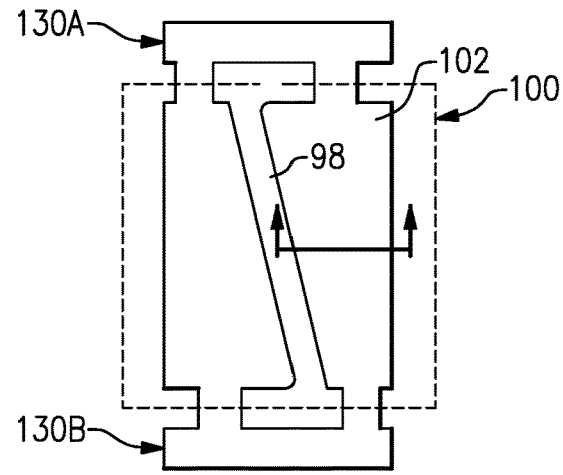
FIG. 7 is a schematic view of another core defining passages within a blade outer air seal.

Referring to FIG. 7, another core assembly 102 is schematically illustrated for forming passages within a completed BOAS 100. The example BOAS 100 is shown schematically by the dashed line and includes passages that are formed by the core 102. In this example, the core 102 includes a uniform shape and configuration from a first end portion 130a to a second end portion 130b. The cross-section of the core 102 includes a unique shape that improves manufacturability while maintaining configurations desirable for air passages in a completed BOAS 100.

In each of the disclosed example passage cross-sections, the hot side, also referred to as the flow path side of the passage wall of the BOAS 100 is the side that is down in the Figures.

Figure 8:
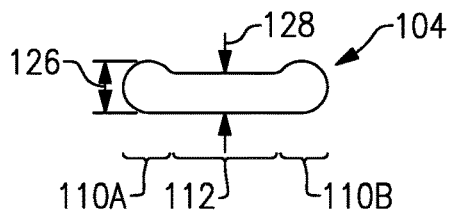
FIG. 8 is a schematic view of an air passage cross-section embodiment.

Referring to FIG. 8 with continued reference to FIG. 7, a first passage cross section 104 includes a middle section 112 between a first side section 110a and a second side section 110b. The middle section 112 includes a height 128 and the side sections 110a and 110b includes a height 126. In this example, the height 126 at each of the side sections 110a and 110b is greater than the height 128 of the middle sections. The end sections 110a and 110b define ribs that provide increased strength to that part of the core 102 during manufacture. The middle section 112 includes the smaller height 128 of the core 102 that is strengthened at the end sections 110a and 110b. Accordingly, the cross-section 104 of the core 102 can have ribs that provide strengthening features to enable more robust manufacturability while also maintaining the smaller cross sectional area in the middle section 112 that provides the desired thermal transfer properties in the completed BOAS 100.

In this example, the ribs defined at the end sections 110a and 110b extend on a side that is not exposed to flow path side of the BOAS 100. In other words, the ribs of the end sections 110a and 110b extend from a side opposite the flow path or hot side of the BOAS and the side of the passage that is uniform or flat as shown in FIG. 8 is on the flow path side.

In this example the height 126 is no more than two (2) times the height 128 of the middle section 112. In another disclosed example embodiment, the height 126 is two (2) times the height 128 of the middle section 112.

Figure 9:
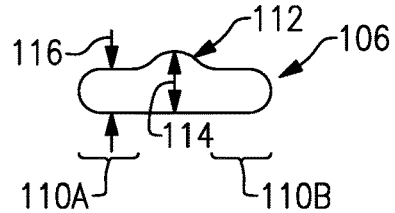
FIG. 9 is a cross-section of another example air passage embodiment.

Referring to FIG. 9, another passage cross section 106 includes the middle section 112 with a height 114 and the side sections 110a and 110b with a height 116. In this example, the middle section 112 includes the greater height 114 while the end sections 110a and 110b include a reduced height. The height 114 of the middle section 112 in one example embodiment is no more than two (2) times the height 116 of the end sections 110a and 110b. In another example embodiment the height of the middle section 112 is two (2) times the height 116 at the end sections 110a and 110b. In this example cross-section 106, the center middle section 112 with the increased height 114 faces away from the hot side, or flow path side of the BOAS, and the side opposite is nearest the flow path side of the BOAS.

Figure 10:
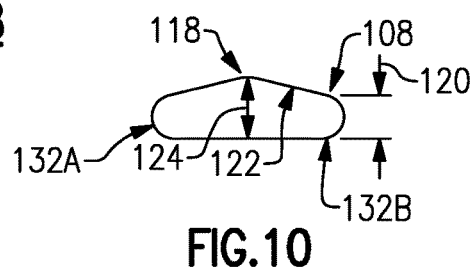
FIG. 10 is yet another cross-section of an example air passage embodiment.

Referring to FIG. 10, another passage cross section 108 includes a middle section 118 with a height 124. Each end section 132A, 132B includes a height 120 that is smaller than the height 124. A transition region 122 is disposed between the middle section 118 and the end sections 132A, 132B such that a smooth transition from the height 124 to the height 120 is provided by the core 102. In one example embodiment, the height 124 is no more than two (2) times the height 120 at the end sections 132A and 132b. In another example embodiment, the height 120 is two (2) times the height 120 at the end sections 132A and 132B. Again, in this example the middle portion 118 increased height is provided in a direction away from the flow path side, such that the passage defines a uniform straight surface on the flow path side.

Accordingly, the variable cross sections of the example core provide improved strength and durability to improve and ease manufacturing while maintaining the desired thermal transfer properties for the completed BOAS. Moreover, while the example core is disclosed by way of example for a BOAS, other structures that include passages formed using a core would benefit from this disclosure and are within the contemplation of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An air cooled engine component for a gas turbine engine, the air cooled engine component comprising:
   a first end;
   a second end;
   a middle portion; and
   at least one continuous internal passage extending from the first end through the middle portion to the second end, the at least one continuous internal passage including a first cross-section within the first end and the second end and a second cross-section within the middle portion,
   wherein the first cross-section includes a first height and the second cross-section includes a second height, the first height being greater than the second height,
   wherein the first height is uniform across the first cross-section for a first width and the second height is uniform across the second cross-section for a second width,
   wherein the air cooled engine component is a single continuous engine component, and
   wherein the first height is no more than twice as large as the second height.

2. The air cooled engine component as recited in claim 1, wherein the at least one continuous internal passage comprises respective transition portions positioned between a portion of the at least one continuous internal passage located in the middle portion and respective portions of the at least one continuous internal passage located in each of the first end and the second end.

\* \* \* \* \*